W. F. DREW.
VEHICLE LOADING AND SUSPENDING DEVICE.
APPLICATION FILED DEC. 20, 1917.
1,261,497.
Patented Apr. 2, 1918.
3 SHEETS—SHEET 3.
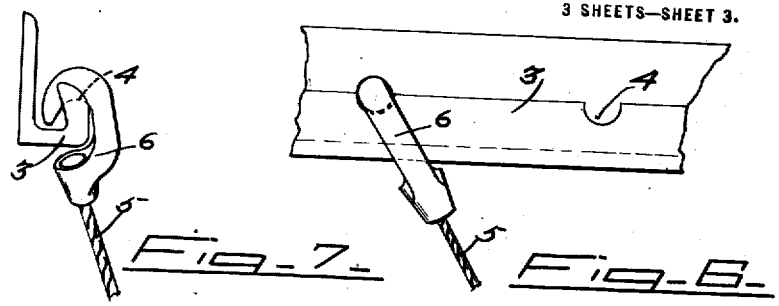
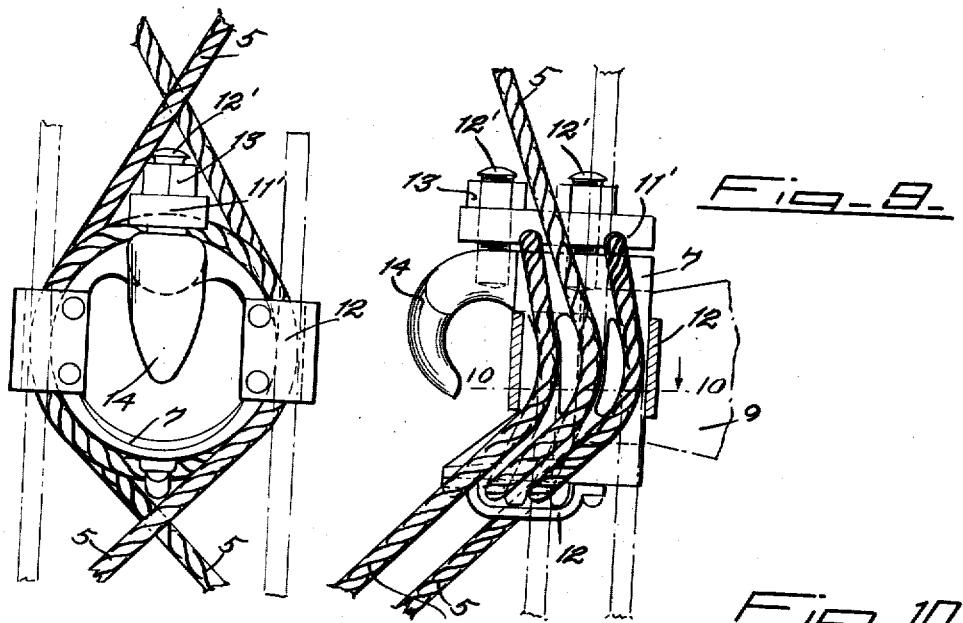
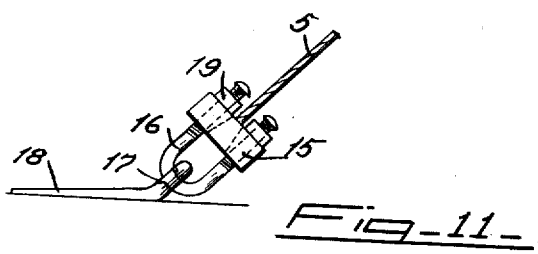
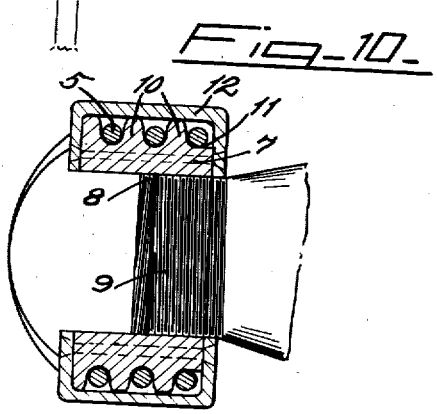
INVENTOR.
Wm F. Drew
BY
Cosser & Totten
ATTORNEYS.

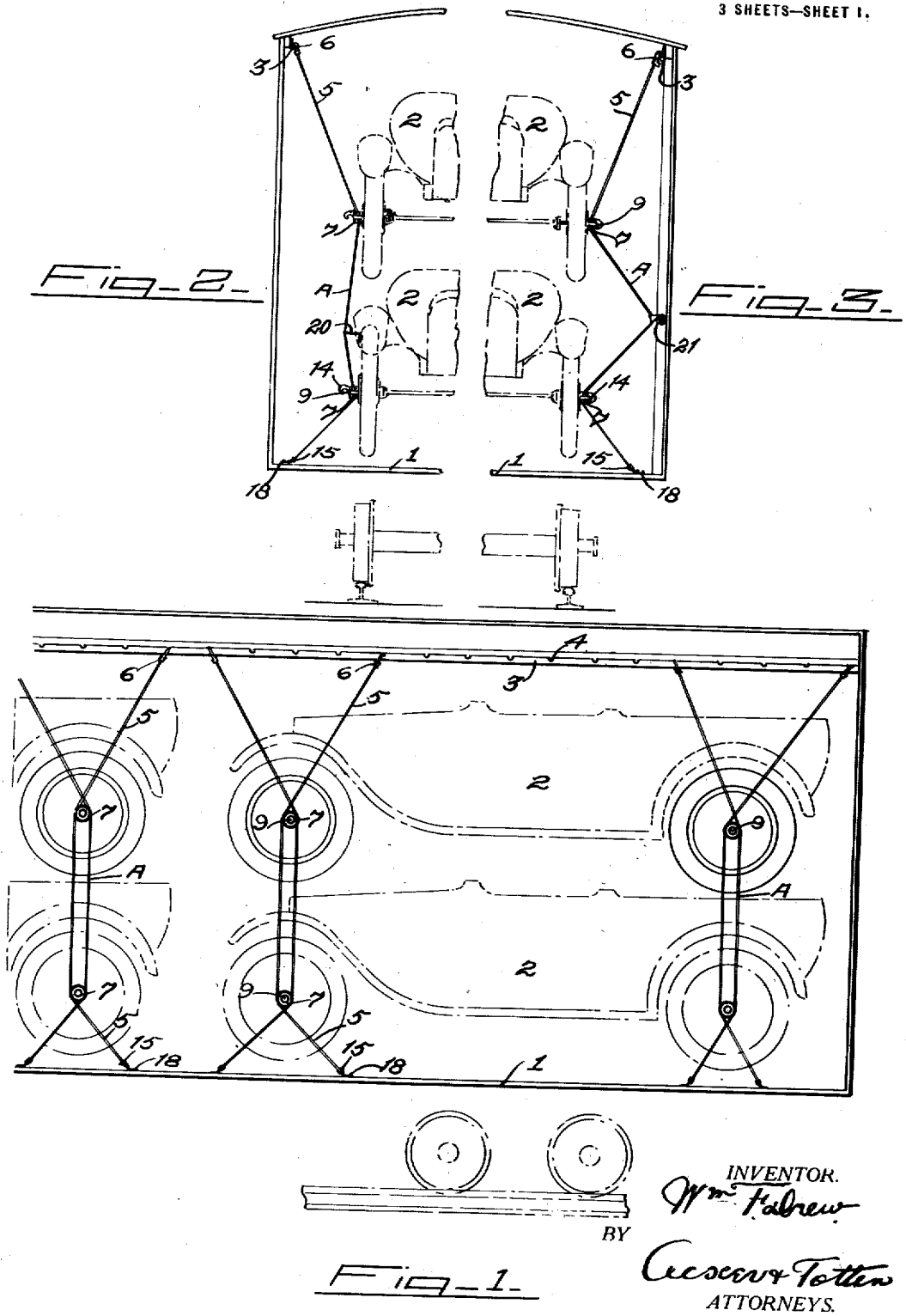

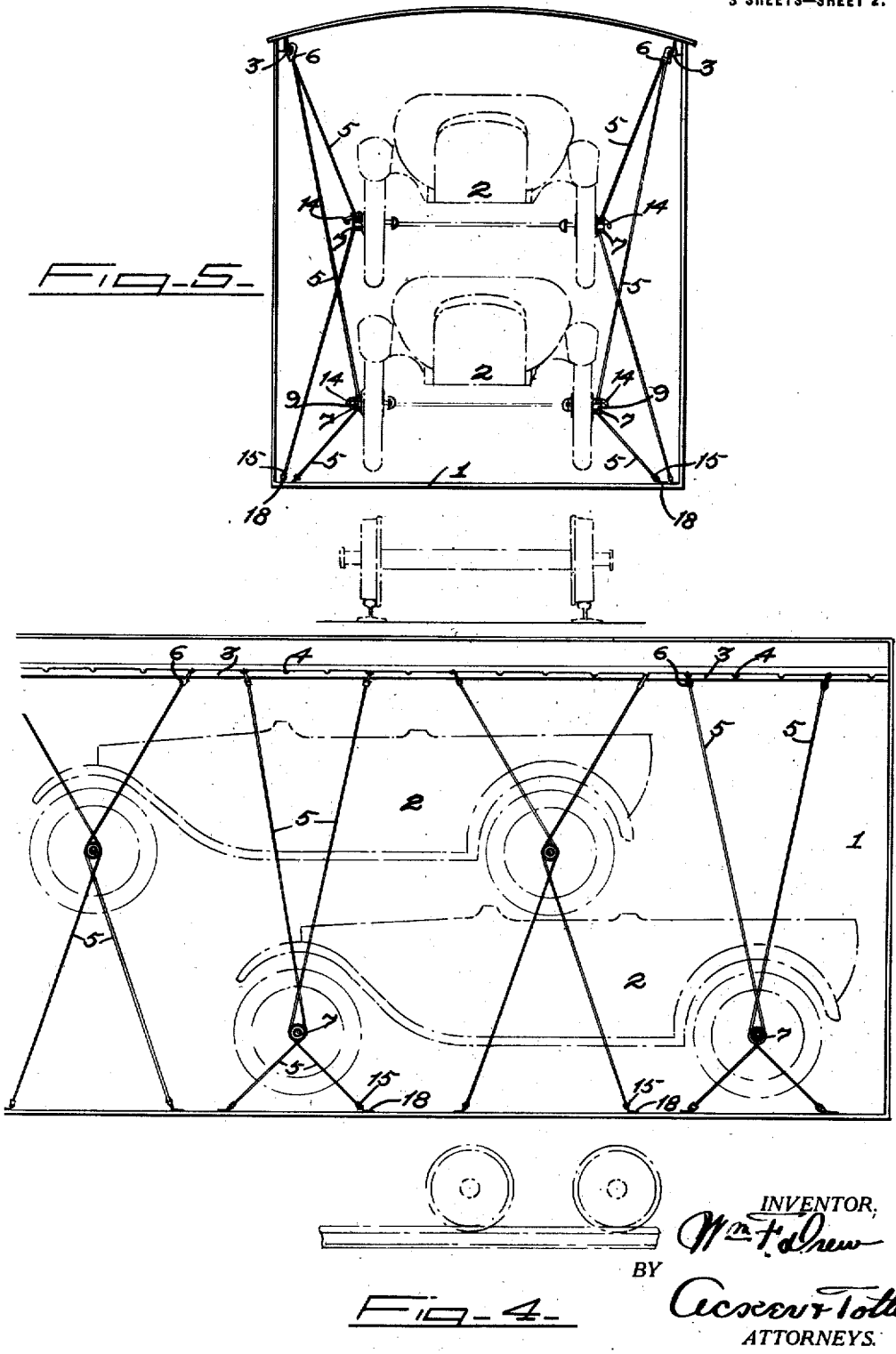

UNITED STATES PATENT OFFICE.

WILLIAM F. DREW, OF OAKLAND, CALIFORNIA, ASSIGNOR TO JOSEPH WILLIAM SOUTHER, OF SAN FRANCISCO, CALIFORNIA.

VEHICLE LOADING AND SUSPENDING DEVICE.

1,261,497. Specification of Letters Patent. Patented Apr. 2, 1918.

Application filed December 20, 1917. Serial No. 208,005.

*To all whom it may concern:*

Be it known that I, WILLIAM F. DREW, a citizen of the United States, residing at Oakland, in the county of Alameda and State of California, have invented certain new and useful Improvements in Vehicle Loading and Suspending Devices, of which the following is a specification.

Automobiles when shipped from the factory to the distributer or user are, in most cases, fully assembled, and are positioned end to end within a freight or other car, preferably of the box type, but owing to the length of automobiles the shipping cars therefor are capable of carrying but three or four when shipped in single rows.

Attempts have been made to arrange the automobiles in two rows, one above the other longitudinally of the car, but in most of these constructions an especially built car is required, and the apparatus for retaining the automobiles within the car is of such great expense as to make the use of the same very costly.

The present invention relates to a very simple and inexpensive apparatus for suspending automobiles one above the other in cars in such manner that all free movement of the vehicles is prevented, thus preventing injury thereto due to the sudden stopping or starting of the car.

The invention has for its principal objects to provide an apparatus by the employment of which automobiles or other wheeled vehicles may be suspended within a car, one above the other and anchored from lateral movement; one capable of positioning within a car without materially altering the interior of the car; one capable of being manufactured at little cost and designed for returning to the point of shipment for reloading, thereby reducing to a minimum the cost of each individual car shipment, and at the same time increasing the number of vehicles capable of being shipped at one time.

The invention consists broadly in providing flexible hangers for each side of the automobile and each attached at one end to the car, adjacent its roof, providing a suspension engaging the vehicle running gear when raised from the car floor and secured at its opposite end to the car adjacent the floor thereof, the ends of the suspension means extending at such angles from the point of attachment to the vehicle as to provide a guy means to prevent the swinging thereof.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in longitudinal section of a portion of a railway box car with several vehicles arranged and suspended therein in accordance with my invention.

Fig. 2 is a vertical cross sectional view of one arrangement of the hangers to prevent lateral movement of the vehicles in the car and to space the hangers from the vehicle fenders.

Fig. 3 is a view similar to Fig. 2, illustrating another arrangement of the suspension members.

Fig. 4 is a view similar to Fig. 1, illustrating the suspension of the vehicles within a box car when the vehicles are arranged in staggered relation, one above the other, longitudinally of the center of the car.

Fig. 5 is a cross sectional view of the construction illustrated in Fig. 4, disclosing the anchoring of the ends of the hangers to prevent swinging movement of the vehicles within the car.

Fig. 6 is a view in front elevation of one of the supporting rails for the upper ends of the hangers.

Fig. 7 is an end view of the supporting rail illustrated in Fig. 6.

Fig. 8 is a view in elevation of one of the means for attaching the hangers to the vehicle running gear.

Fig. 9 is a side elevation of the attaching means illustrated in Fig. 8.

Fig. 10 is a sectional view of a hanger taken on line 10—10 of Fig. 9.

Fig. 11 is a view in detail of the means for attaching or anchoring the lower ends of the hangers to the car body.

Referring more particularly to the several views of the drawings wherein liks characters of reference designate corresponding parts, 1 indicates a suitable railway car preferably of the box type and capable of containing and transporting a plurality of automobiles or other wheeled vehicles 2 arranged in rows, one above the other, preferably longitudinally of the center of the car. Supporting rails 3 of the angle type, Figs. 6 and 7, provided with the notches 4, preferably extend longitudinally of the opposite inner sides of the car, they being secured therein, adjacent the roof, as in Figs. 1 to 5 of the drawings..

In Figs. 1 to 3 of the drawings, the vehicles 2 are arranged one directly above the other and each hanger is connected with the running gear of each vehicle, thereby suspending two vehicles by four hangers. The hanger members are each preferably in the form of flexible members 5, preferably cables and two in number, having at their upper ends the hooks 6 or other means for detachable engagement with the rails 3. The cables for each hanger are passed preferably in opposite directions around suitable attaching members 7, preferably two in number, and each designed for having threaded or other suitable connection, as at 8, with one of the vehicle wheel hubs 9. This attachment is accomplished preferably by holding the attaching member 7 and revolving the wheel hub 9 after the wheel has been lifted from the car floor by a jack or other suitable means. The cables as wrapped around the members 7 are received between the lugs 10 extending from the upper surface thereof, and which provide interrupted substantially spiral grooves 11.

Suitable plates 12 are secured to the members 7 and pass over the lugs 10, Fig. 10 of the drawings, preventing the unwinding of the cables from the attaching members when the hangers are detached from their coöperating hubs..

A suitable clamp bar 11' slidable longitudinally of the bolts 12' mounting clamping nuts 13 extends over the windings on the attaching members 7 and is capable of being forced into engagement with the windings to clamp the cables thereto, Fig. 9 of the drawings, by the adjustment of said nuts 13.

A suitable hook 14 is formed integrally with the members 7 and is adapted to have a suitable tackle, not shown, connected therewith after the member 7 has been mounted on the wheel hub and it is desired to lift the wheel from the car floor.

The lower end of each cable carries an adjustable member for securing to the car floor to place the proper tension on the cable, and the preferred form illustrated in Fig. 11 consists of a block 15 through which is passed the end of the cable, the block having sliding movement on a suitable yoke 16 passing through an eye 17 of a plate 18 for attachment in any suitable manner to a car floor. The block is moved relatively to the yoke to tighten the cable by the adjustment of nuts 19 threaded to the yoke, as in Fig. 11 of the drawings.

The hooks, cables and anchoring members are connected in such a manner with the attaching members as to permit the attaching members to be adjusted relatively to the end of the cables and at the same time to prevent the separation of the parts.

When the vehicles are transported, as in Figs. 1, 2 and 3 of the drawings, one of the attaching members 7 is secured to each vehicle hub, a suitable lifting tackle is then connected with the hooks 14 and the vehicle is elevated in the car. After the vehicle has been raised the desired distance, the hooks 6 are positioned in one of the notches 4 of the rail 3, as in Fig. 1 of the drawings, preferably causing a crossing of the cable 5 immediately above the supporting member 7. The bar 11 is released to permit the adjusting of the cable about the same to tighten the stretch thereof intermediate the rail and the attaching member, at which time the bar 11 may be forced into position, tightening the cable windings on the attaching members. The lifting tackle may be then removed from the hooks 14, permitting the vehicle to be suspended by the hangers. The lower vehicle is then moved into place and the attaching members 7 are secured one to each hub thereof. The vehicle is then raised by suitable tackle engaging the hooks 14 until the vehicle is lifted the required distance from the car floor at which time the clamp bar 11' associated with the lower attaching members is forced into engagement with the cable coiled about said members, thereby retaining the lower vehicle suspended from the car floor by the cables.

The lower free ends of the respective cables are then preferably crossed, as in Fig. 1, and are drawn laterally, preferably under tension, at which time the plates 18 are secured to the car floor, as in Figs. 1 and 11 of the drawings. The nuts 19 are then forced downwardly on the yokes 16, placing the cables 5 of each hanger under greater tension and guying the vehicles from swinging movement within the car.

The portion A of the cables, Figs. 1, 2 and 3 of the drawings, intermediate the upper and lower vehicle is preferably held outwardly from the vehicles to prevent engaging the fenders of the lower vehicle, and in Fig. 2 this result is accomplished by a strut 20 interposed between the cables 5 and the upper portion of the lower vehicle tires. In Fig. 3 of the drawings another form of construction is illustrated, wherein the portion A is secured to the bar 21 carried by the car's side wall intermediate the attaching members 7 of the respective upper and lower vehicles.

In this construction only four hangers are required to suspend two vehicles, each of the four hangers being attached to the running gear of both vehicles, and said hangers are preferably arranged in pairs at the opposite ends of said vehicles.

In the arrangement illustrated in Figs. 4 and 5, wherein four hangers are employed for supporting each vehicle, the vehicles are arranged in staggered relation one above the other longitudinally of the center of the car, with but one attaching member associated with each hanger, the free ends of the cables or flexible members of each hanger radiate obliquely from the point of attachment to support the vehicle, and are secured at their free ends to the car body, thereby anchoring the suspended vehicle within the car and preventing swinging movement of the same either laterally or longitudinally of said car.

Having thus described my invention, what I claim as new and desire to protect by Letters Patent is:—

1. A hanger for suspending a vehicle within a car for the transporting of the same, comprising flexible members adapted for securing at their opposite ends to the interior of the car adjacent to the top and bottom thereof, means coöperating with the vehicle and to which said hangers are secured intermediate of their ends, the upper and lower free ends of said hangers radiating obliquely from said means to the point of attachment with the car whereby the vehicle is guyed from movement within the car.

2. A hanger for suspending a vehicle within a car for the transporting of the same, comprising members adapted for securing at their opposite ends to the interior of the car adjacent to the top and bottom thereof, means coöperating with the vehicle and to which said hangers are secured intermediate of their ends, the upper and lower free ends of said hangers radiating from said means to the point of attachment with the car whereby the vehicle is guyed from movement within the car.

3. A hanger for suspending a vehicle within a car for the transporting of the same, comprising a flexible member for detachably securing at its opposite ends to the interior of the car adjacent the top and bottom thereof and intermediate the ends of which said vehicle is supported at a point raised from the car floor, the free ends of said flexible hanger radiating from said vehicle to their point of attachment to the car whereby the vehicle is guyed from movement within the car.

4. A hanger for suspending a vehicle within a car for the transporting of the same, comprising a flexible member for detachably securing at its opposite ends to the interior of the car adjacent the top and bottom thereof and intermediate the ends of which said vehicle is supported at a point raised from the car floor, the free ends of said flexible hanger radiating obliquely from said vehicle to their point of attachment to the car whereby the vehicle is guyed from movement within the car.

5. A hanger for suspending a vehicle within a car for the transporting of the same, comprising a pair of flexible members adapted for securing at their opposite ends to the interior of the car adjacent to the top and bottom thereof, said members coöperating within their length with said vehicle to support the same at a point raised from the car floor, the free ends of said members above and below the point of coöperation with the vehicle being crossed, and an adjustable connection between the lower free ends of said members and the point of attachment to the car floor.

6. A hanger for suspending a vehicle within a car for the transporting of the same, comprising a pair of flexible members, an attaching member secured to the vehicle running gear and with which said flexible members are interconnected, said attaching member capable of movement longitudinally of said flexible members, means for locking said attaching member and flexible members together, and means carried at the opposite ends of said flexible members whereby the same may be attached to the car to suspend the vehicle therein at a point raised from the car floor.

7. A hanger for suspending a vehicle within a car for the transporting of the same, comprising a flexible member positioned one adjacent each corner of the vehicle and each secured at its opposing ends to the interior of the car adjacent the top and floor thereof, attaching means extending transversely of the vehicle adjacent its front and rear ends and with which the flexible members at the opposite sides of the vehicle have engagement for suspending the vehicle within the car at a point raised from the car floor, the free ends of each of said flexible members above and below the point of engagement to the attaching means extending at an angle therefrom to the point of connection with the car whereby swinging of the vehicle while suspended is prevented.

8. A hanger for supporting a vehicle within a car for the transporting of the same, comprising an attaching member for attachment to the vehicle, a pair of flexible members coöperating with and relative to which said attaching member is adjustably mounted for suspending the same within the car and said members provided at their free ends with means for attaching said ends to the interior of the car adjacent the floor and roof thereof, and releasable clamping means for holding the attaching member fixed relative to the flexible members with the vehicle suspended above the car floor.

9. A member for attaching a hanger to a vehicle, comprising a tubular body for threaded attachment to the vehicle hub, and provided on its exterior surface with means for receiving a flexible supporting member adapted for wrapping therearound to have interlocked engagement therewith.

10. A member for attaching a hanger to a vehicle comprising a tubular body for threaded connection with a vehicle hub, said body provided with a grooved exterior surface for receiving a flexible supporting member, and means carried by the body and overlying the groove surface for engaging the flexible supporting member to prevent free movement thereof relative to the body.

11. A member for attaching a hanger to a vehicle comprising a tubular body for threaded connection with a vehicle hub, said body provided with a grooved exterior surface for receiving a flexible supporting member, means carried by the body and overlying the groove surface for engaging the flexible supporting member to prevent free movement thereof relative to the body, and an integral hook portion projecting from said tubular body.

12. The combination with a car, of a plurality of vehicles superimposed therein, of a plurality of hangers, one coöperating with the corresponding wheels of each vehicle for suspending said vehicles within the car one above the other in spaced relation, each hanger comprising a pair of flexible members connected at their opposite ends to the car adjacent the roof and floor thereof, a plurality of attaching members carried by each hanger and adapted one for engagement with each corresponding wheel hub, said attaching members capable of independent adjustment relative to the flexible members, means for locking said attaching members to their respective flexible members, and means for forcing the portion of said flexible members intermediate said attaching members outwardly from the lower vehicle, the free upper and lower ends of said flexible members radiating obliquely from the attaching member to the point of connection with the car body.

13. The means for suspending vehicles within a car for transportation, comprising a plurality of hangers each detachably secured at its upper end to the car body adjacent its roof, said hangers each coöperating within its length with the vehicle chassis for suspending the vehicle within the car and each of said hangers being detachably secured at its lower end to the car body adjacent the floor thereof, the portions of said hangers at each side of the point of coöperation with the vehicle being so arranged as to prevent lateral or longitudinal swinging movement of the suspended vehicle within the car.

14. The means for suspending vehicles within a car for transportation, comprising a plurality of hangers each detachably secured at its upper end to the car body adjacent its roof, said hangers each coöperating within its length with the vehicle chassis for suspending the vehicle within the car and each of said hangers being detachably secured at its lower end to the car body adjacent the floor thereof, the portions of said hangers at each side of the point of coöperation with the vehicle being so arranged as to prevent lateral or longitudinal swinging movement of the suspended vehicle within the car, and adjustable means within each hanger for tightening the same after the ends thereof are secured in position.

15. The means for suspending vehicles within cars for transporting the same, comprising a plurality of substantially vertical members, the upper ends thereof being anchored and converging from their point of anchorage and the lower ends thereof being anchored and diverging toward the anchoring points therefor, and means associated therewith for holding a vehicle thereto intermediate the free ends thereof and adjacent to said points of convergence and divergence.

In testimony whereof I have signed my name to this specification in the presence of a subscribing witness.

WILLIAM F. DREW.

Witness:
D. B. RICHARDS.